(12) United States Patent
Miller et al.

(10) Patent No.: US 10,841,498 B1
(45) Date of Patent: *Nov. 17, 2020

(54) COMPUTER VISION SYSTEM WITH PHYSICAL SECURITY COACHING

(71) Applicant: RoundhouseOne Inc., San Francisco, CA (US)

(72) Inventors: Mark Raymond Miller, San Francisco, CA (US); Archana Ramachandran, San Francisco, CA (US); Christopher C. Anderson, San Francisco, CA (US)

(73) Assignee: RoundhouseOne Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,784

(22) Filed: Jun. 28, 2019

(51) Int. Cl.
| | |
|---|---|
| *H04N 5/93* | (2006.01) |
| *H04N 5/232* | (2006.01) |
| *G06F 9/54* | (2006.01) |
| *G06F 9/50* | (2006.01) |
| *G06F 9/38* | (2018.01) |
| *G06T 1/00* | (2006.01) |

(52) U.S. Cl.
CPC ..... *H04N 5/232933* (2018.08); *G06F 9/3885* (2013.01); *G06F 9/5027* (2013.01); *G06F 9/542* (2013.01); *G06T 1/0007* (2013.01); *H04N 5/23206* (2013.01)

(58) Field of Classification Search
CPC ............ G08B 25/009; G08B 13/19645; G06K 9/00302; G06K 9/00335; G06K 9/00362; G06K 9/00624; G06K 9/00744; G06K 2009/00738; G06T 7/20
See application file for complete search history.

(56) References Cited

U.S. PATENT DOCUMENTS

| | | | | |
|---|---|---|---|---|
| 2009/0102924 | A1* | 4/2009 | Masten, Jr. | ...... G08B 13/19608 348/155 |
| 2016/0267759 | A1* | 9/2016 | Kerzner | ........... G08B 13/19684 |
| 2018/0018508 | A1* | 1/2018 | Tusch | ................ G06K 9/00771 |
| 2018/0330198 | A1* | 11/2018 | Harary | ............... G06K 9/00691 |
| 2019/0242718 | A1* | 8/2019 | Siskind | .............. G01C 21/3461 |
| 2019/0392588 | A1* | 12/2019 | Far | ......................... G08B 21/18 |

* cited by examiner

*Primary Examiner* — Kelly L Jerabek
(74) *Attorney, Agent, or Firm* — Paul Davis

(57) ABSTRACT

A computer vision system includes a camera that captures a plurality of image frames in a target field. A user interface is coupled to the camera. The user interface is configured to perform accelerated parallel computations in real-time on the plurality of image frames acquired by the camera. The system provides physical security coaching.

20 Claims, 7 Drawing Sheets

COMPUTER VISION SYSTEM WITH PHYSICAL SECURITY COACHING

BACKGROUND

Field of the Invention

This invention relates to computer vision, and more particularly, to computer vision systems that provides physical security coaching.

Description of the Related Art

The video captured by a camera is usually streamed and hence, lacks privacy. The video stream and camera parameters are used to detect people and relay infield coordinates. Camera parameters include but are not limited to: Camera height, angle of the camera via the y axis and the ground, taking image data and make sense of the camera data no matter how it is set up, and the like.

The external camera parameters are different for each image. They are given by:

$T=(T_x, T_y, T_z)$ the position of the camera projection center in world coordinate system.

R the rotation matrix that defines the camera orientation with angles $\omega$, $\varphi$, $\kappa$ (PATB convention.)

$$R = R_x(\omega)R_y(\phi)R_z(\kappa) = \begin{pmatrix} 1 & 0 & 0 \\ 0 & \cos(\omega) & -\sin(\omega) \\ 0 & \sin(\omega) & \cos(\omega) \end{pmatrix} \begin{pmatrix} \cos(\phi) & 0 & \sin(\phi) \\ 0 & 1 & 0 \\ -\sin(\phi) & 0 & \cos(\phi) \end{pmatrix} \begin{pmatrix} \cos(\kappa) & -\sin(\kappa) & 0 \\ \sin(\kappa) & \cos(\kappa) & 0 \\ 0 & 0 & 1 \end{pmatrix} = \begin{pmatrix} \cos\kappa\cos\phi & -\sin\kappa\cos\phi & \sin\phi \\ \cos\kappa\sin\omega\sin\phi + \sin\kappa\cos\omega & \cos\kappa\cos\omega - \sin\kappa\sin\omega\sin\phi & -\sin\omega\cos\phi \\ \sin\kappa\sin\omega - \cos\kappa\cos\omega\sin\phi & \sin\kappa\cos\omega\sin\phi + \cos\kappa\sin\omega & \cos\omega\cos\phi \end{pmatrix} \quad (1)$$

If $X=(X, Y, Z)$ is a 3D point in world coordinate system, its position $X'=(X', Y', Z')$ in camera coordinate system is given by:

$$X'=R^T(X-T) \quad (2)$$

A camera without a distortion model is given as follows:
The pixel coordinate $(x_u, y_u)$ of the 3D point projection without distortion model is given by:

$$\begin{pmatrix} x_u \\ y_u \end{pmatrix} = \begin{pmatrix} \frac{fX'}{Z'} \\ \frac{fY'}{Z'} \end{pmatrix} + \begin{pmatrix} c_x \\ c_y \end{pmatrix} \quad (3)$$

Where f is the focal length in pixel, and $(c_x, c_y)$ the principal point in pixel coordinates.
Camera with Distortion Model
A camera with a distortion model is as follows:
Let:

$$\begin{pmatrix} x_h \\ y_h \end{pmatrix} = \begin{pmatrix} \frac{X'}{Z'} \\ \frac{Y'}{Z'} \end{pmatrix} \quad (4)$$

be the homogeneous point, $$r^2 = x_h^2 + y_h^2 \quad (5)$$

the squared 2D radius from the optical center, R1, R2, R3 the radial and T1, T2 the tangential distortion coefficients. The distorted homogeneous point in camera coordinate system $(x_{hd}, y_{hd})$ is given by:

$$\begin{pmatrix} x_{hd} \\ y_{hd} \end{pmatrix} = \begin{pmatrix} (1 + R_1 r^2 + R_2 r^4 + R_3 r^6)x_h + 2T_1 x_h y_h + T_2(r^2 + 2(x_h)^2) \\ (1 + R_1 r^2 + R_2 r^4 + R_3 r^6)y_h + 2T_2 x_h y_h + T_1(r^2 + 2(y_h)^2) \end{pmatrix} \quad (6)$$

The pixel coordinate $(x_d, y_d)$ of the 3D point projection with distortion model is given by:

$$\begin{pmatrix} x_d \\ y_d \end{pmatrix} = -\begin{pmatrix} fx_{hd} \\ fy_{hd} \end{pmatrix} + \begin{pmatrix} c_x \\ c_y \end{pmatrix} \quad (7)$$

Where f is the focal length in pixel, and $(c_x, c_y)$ the principal point in pixel coordinates.
Fisheye Lens
The distortion for a fisheye lens is defined by:
The parameters C, D, E, F that describe an affine deformation of the circular image in pixel coordinates.
The diagonal elements of the affine matrix can be related to the focal length f:

$$f = \frac{2C}{\pi} \quad (8)$$

The off-diagonal elements are connected to the distortion of the projected image circle, which, in the most general case, can be a rotated ellipse.
The coefficients p2, p3, p4 of a polynomial:

$$\rho = \theta + p_2 \theta^2 + p_3 \theta^3 + p_4 \theta^4 \quad (9)$$

Where:

$$\theta = \frac{2}{\pi} \arctan\left(\frac{\sqrt{X'^2 + Y'^2}}{Z'}\right); \theta \in [0,1] \quad (10)$$

The pixel coordinate $(x_d, y_d)$ of the 3D point projection with a fisheye distortion model is given by:

$$\begin{pmatrix} x_d \\ y_d \end{pmatrix} = \begin{pmatrix} C & D \\ E & F \end{pmatrix} \begin{pmatrix} x_h \\ y_h \end{pmatrix} = \begin{pmatrix} c_x \\ c_y \end{pmatrix} \quad (11)$$

Where:

$$\begin{pmatrix} x_h \\ y_h \end{pmatrix} = \begin{pmatrix} \frac{\rho X'}{\sqrt{X'^2 + Y'^2}} \\ \frac{\rho Y'}{\sqrt{X'^2 + Y'^2}} \end{pmatrix} \quad (12)$$

And $(c_x, c_y)$ is the principal point in pixel coordinates.
Camera Rig External Parameters
A camera rig consists of multiple cameras that are connected together with geometric constraints. A camera rig has the following characteristics:

One camera is taken as reference (master) camera with a given position Tm, and orientation Rm in world coordinates.

All the other cameras are secondary cameras with position Ts and orientation Rs in world coordinates.

For each secondary camera, the relative translation Trel and rotation Rrel with respect to the reference camera is known.

The position and orientation for secondary rig cameras are defined w.r.t. the reference (master) camera such that:

$$T_s = T_m + R_m T_{rel} \quad (13)$$

$$R_s = R_m R_{rel} \quad (14)$$

The position X' of a 3D point in the reference (master) camera coordinate system is given by:

$$X' = R_m^T(X - T_m) \quad (15)$$

The position X' of a 3D point in the coordinate system of a secondary camera is given by:

$$X' = R_{rel}^T [R_m^T(X - T_m) - T_{rel}] \quad (16)$$

Once the 3D point in camera coordinates is calculated, the projection works in the same way as for any other camera There is a need to provide an improved computer vision detection system.

SUMMARY

An object of the present invention is to provide a computer vision system that provides physical security coaching.

Another object of the present invention is to provide a computer vision system that provides performance improvement.

A further object of the present invention is to provide a computer vision system the system provides movement and pathway efficiency These and other objects of the present invention are achieved in, a computer vision system.

A camera captures a plurality of image frames in a target field. A user interface is coupled to the camera. The user interface is configured to perform accelerated parallel computations in real-time on the plurality of image frames acquired by the camera. The system provides physical security coaching.

DETAILED DESCRIPTION

Figure 1:
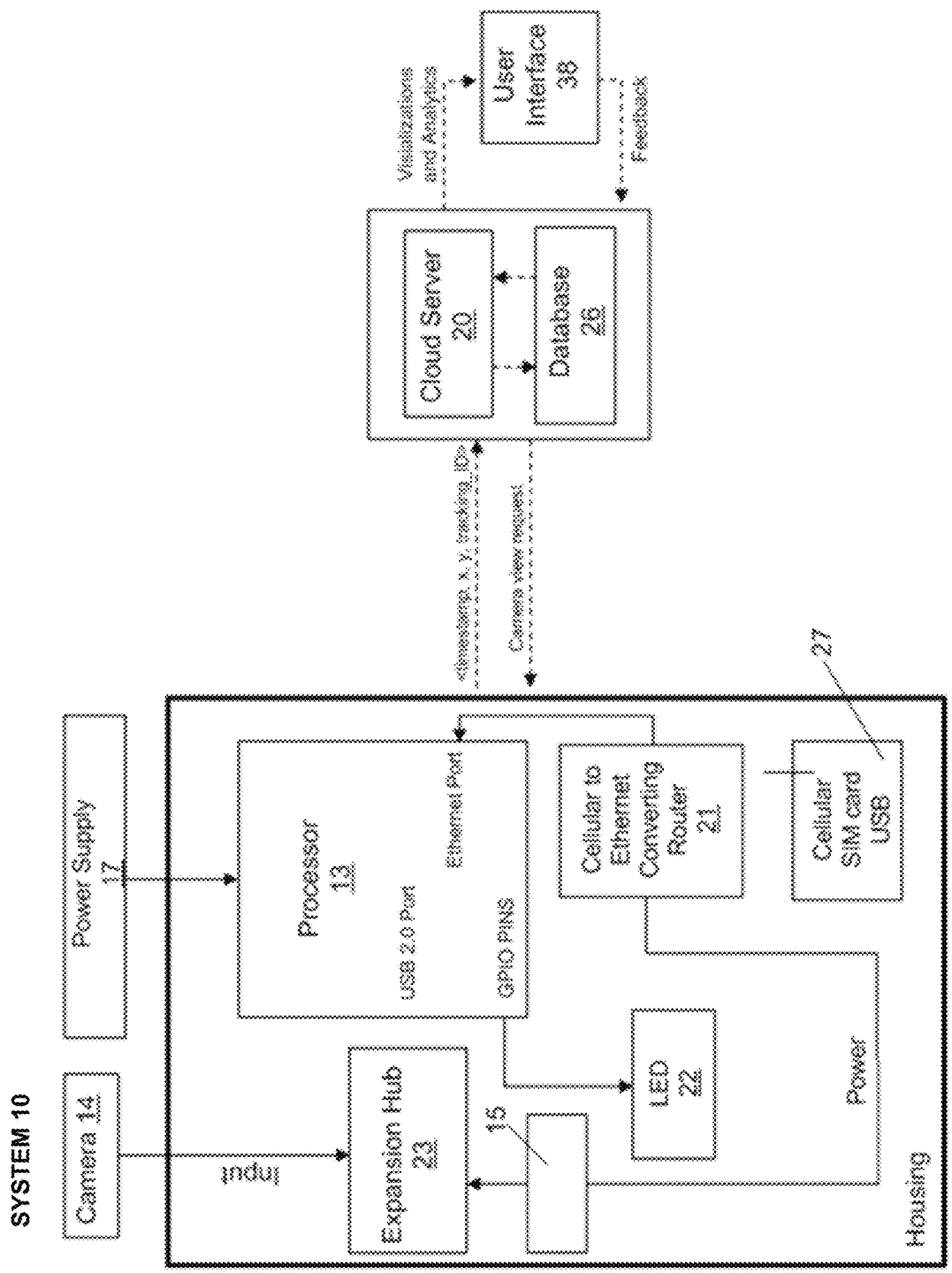
FIG. 1 illustrates one embodiment of a computer vision system of the present invention.
Figure 2:
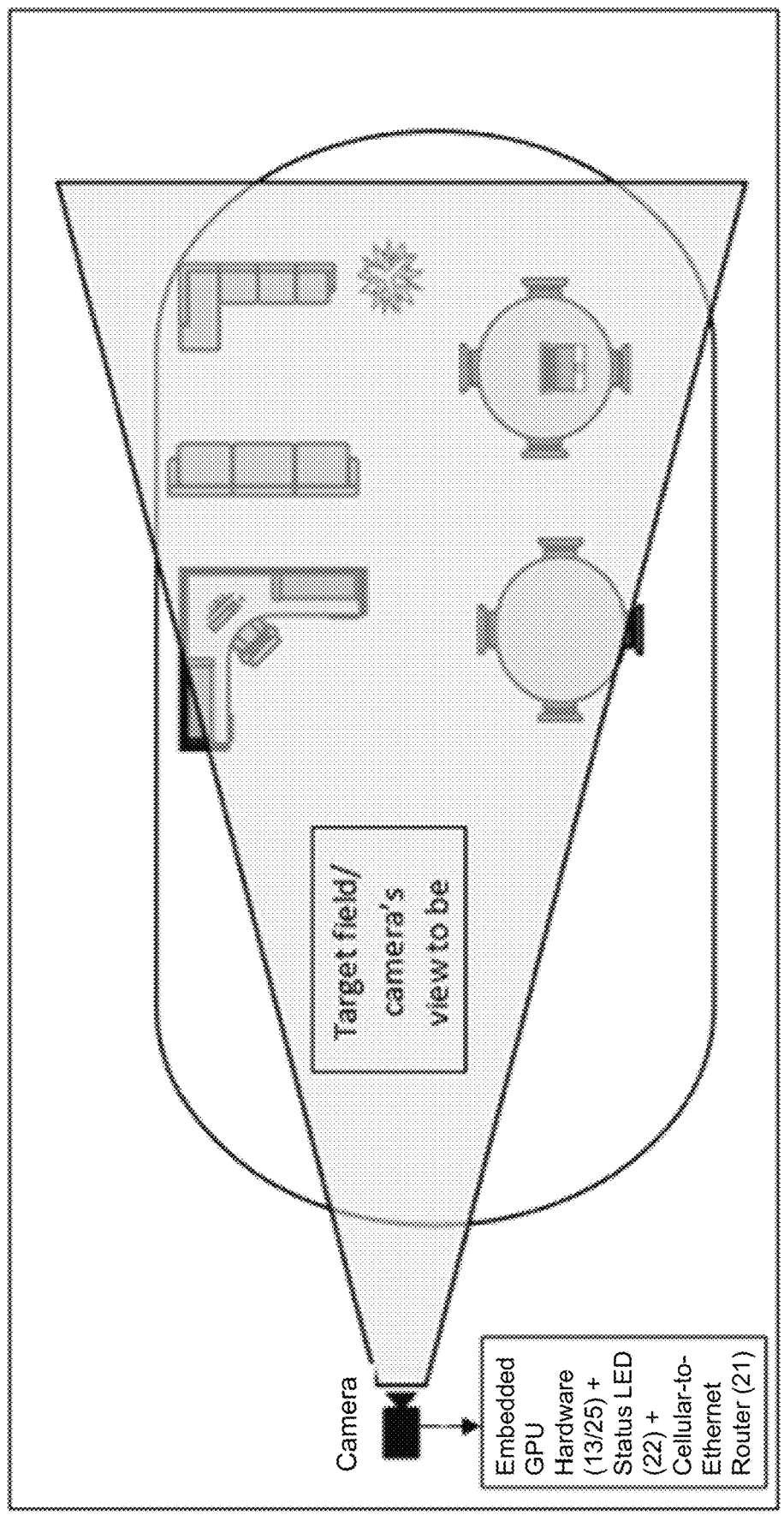
FIG. 2 illustrates one embodiment of a computer vision system of the present invention illustrating a camera's field of view

In one embodiment, illustrated in FIG. 1, a computer vision system 10 is provided. In one embodiment system 10 uses a processor 13 to perform accelerated parallel computations in real-time on a series of image frames acquired by a camera 14 coupled to it. In one embodiment system 10 anonymously detects and tracks people within a target field that is captured by the camera 14, FIG. 2. In one embodiment, system 10 includes user interface 38, a processor 13, camera 14, LED 22 which can provide RGB status indication, extended USB ports 15, housing with wall mounting brackets, an external power supply 17, cellular-to-ethernet conversion router 21, external USB expansion hub 23, and pre-loaded software executed on a Nvidia Jetson TX2 embedded platform 25. System 10 does not stream unmodified/complete video, as more fully set forth hereafter. In one embodiment system 10 is coupled to a cloud server 20, includes a database 26, and a SIM card USB 27.

As a non-limiting example, system 10 can include: a Nvidia Jetson TX2 embedded platform 25 which features an NVIDIA Pascal™ Architecture processor 13, 2 Denver 64-bit CPUs, 8 GB RAM, Connectivity to 802.11ac Wi-Fi, Bluetooth-Enabled Devices, and 10/100/1000BASE-T Ethernet, a single USB3 Type A port, GPIO (General Purpose Input Output) stack, and many more peripherals. In one embodiment the board comes with an external AC Adapter, which as a non-limiting example can be 19V.

In one embodiment due to lack of enough USB Type A ports on the Nvidia embedded board 25, the system 10 uses an external USB expansion hub 23 to connect a USB camera 14 that serves as the source of input to the system 10, and to power the cellular-to-ethernet router 21. The addition of the external USB expansion hub 23 makes it possible for the system 10 to use cellular network as its means to connect to the internet and communicate with the server 20. If absent, the system can communicate only through Wi-Fi or LAN.

In order to convey system status to the user the processor 13 has an embedded board with a "Status LED", that has been programmed to reflect the functioning of system 10 through specific color codes. The status LED visually confirms that the system 10 is up and running as desired, diagnoses sources of malfunction, and indicates the cause(s) via the LEDs. The status LED is programmed to indicate any change in system 19 state almost instantly.

In one embodiment router 21 converts cellular network to Ethernet. The system connects to its server 20 through cellular network, thereby augmenting the board's native ability to connect to the internet via Wi-Fi or ethernet with the ability to connect via a cellular network.

In one embodiment system 10 relies on an open source fully convoluted neural network, YOLOv2, for detecting objects of class "people" within an image and uses a proximity-based tracking algorithm to track people across image frames. In one embodiment system 10 builds on top of open source. As a non-limiting example system 10 uses a YOLOv2 model that is open source neural network written in C and CUDA.

In one embodiment the computer vision system includes: a digital video camera 14 that captures a plurality of image frames of a target field of view. Processor 13 is coupled to the camera 14. Processor 13 configured to perform accelerated parallel computations in real-time on the plurality of image frames acquired by the camera 14 and relay the outputs of those computations to a database on a set of servers 20, where the database 19 is connected to a web accessible user interface 38 which allows users to view and interact with the data as well as add data and information that is stored in the database and visualized via the interface.

The video feed captured by the camera 14 and relayed to the processor for processing and automated analysis but the video feed is never stored in system 10. The images are processed in real time and data regarding the space and its occupants is extracted, and the next frames of the video overwrite those frames that were just processed. Only the data extracted from each frame is stored locally and/or relayed to the system servers 20.

As a non-limiting example, system 10 does not store the video but processes images from the monitored field and stores only the elements of the processed image that are relevant to the deployment. Not storing the video allows the user to create a reduced or redacted re-creation of the event, activities and environment originally captured by the camera 14, with only the elements of interest remaining. In one embodiment, this reduced/redacted data is stored for analysis, processed into a reduced/redacted image.

As a non-limiting example, the reduced/redacted re-creation of the event is stored on the server 20, which may be on client premises, in a public or private cloud, or on a system server 20. As a non-limiting example, it is accessible for replay or near real time streaming on one or more of: a desktop, connected mobile device, wearable, including but not limited to heads up and immersive displays, and the like.

In one embodiment the reduced/redacted data is processed and played back to create a reduced/redacted video or a reduced/redacted immersive environment. As a non-limiting example, system 10 processing is used to capture space use and activity data using passive cameras 14 while maintaining privacy and security of occupants.

In one embodiment, in use during always on camera 14 monitoring for specific event detection, is used to conform with EU "right to be forgotten" legislation while maintaining constant video surveillance. As a non-limiting example system 10 processing is used in near real time for the reduction of excessive stimuli for individuals who need to focus on and/or identify specific phenomena or details.

As a non-limiting example, system 10 the processing of images from the monitored field and storage of only those elements of the processed image that are relevant to the deployment can be used in at least one of: wellness/mindfulness/and stress reduction, by allowing a user to interact with the world with selected or non selected stimuli removed or reduced.

In one embodiment the software used in system 10 has two parent processes running concurrently. The first one detects, locates and tracks people in the camera's field of view. The second one relays this data to the server 20 over the internet. The following describes how each of these parent processes are unique to the system.

In one embodiment data collection of system 10 draws upon the open source real-time object detection algorithm, YOLOv2, converted to C++ programming language from its original C version to support object-oriented programming. Significant syntax changes and library linking issues were resolved in multiple functions and files to achieve this.

YOLOv2 is only capable of detecting objects in an image. In one embodiment, system 10 tracks objects detected by YOLOv2 and exploits the Object-Oriented feature supported only by the modified version of YOLOv2 in C++. Tracking of people within the target field (camera's view) is done based on shortest distance-based association, another open source technique. The tracking IDs are randomly generated and associated with the people in the field, thus preserving their anonymity.

System 10 provides data logging. Pixel location coordinates of the detected people within the target field (camera's view), along with their unique tracking IDs are logged with timestamps in files that are stored locally in on-board memory. The files are preserved until their contents have been successfully transmitted to the server 20.

In one embodiment a timestamped error logging is added to system 10 to allow the user to understand the source of an error and perform required measures to fix them.

Figure 3:
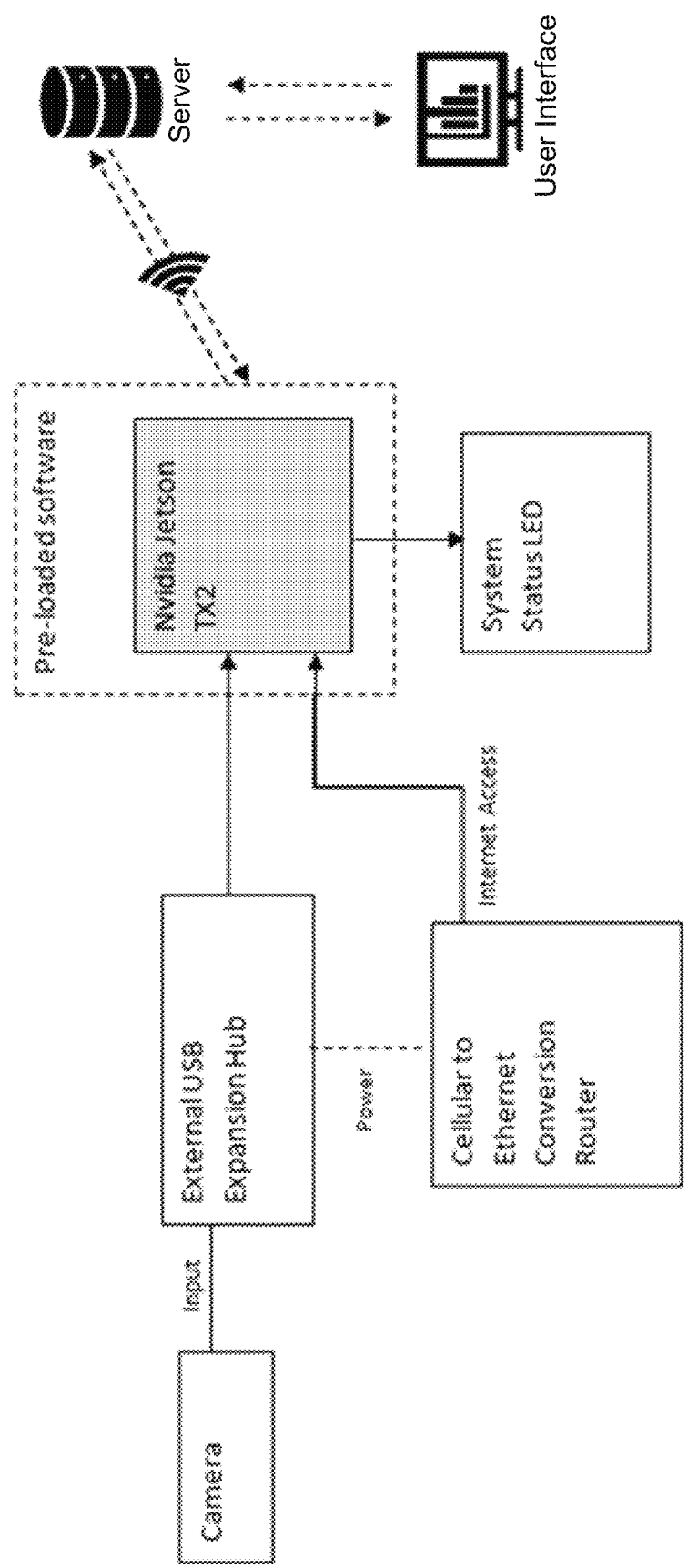
FIG. 3 is a flow chart that illustrates one embodiment of an application of the computer vision seem of the present invention, where a python script in the system is dedicated to relaying the log files, both data and error, to the server, and the script deletes the local copy of the files once they have been posted to the server.

In one embodiment, illustrated in FIG. 3, a python script running on the processor 13 in the system 10 is dedicated to relaying the log files, both data and error, to the server 20. The script deletes the local copy of the files once they have been posted to the server 20. This frees up memory while preventing data loss. The script indicates its successful execution by turning on the BLUE color of the status LED. In case of an error during the uploading process, the script turns off the BLUE color of the status LED, logs the cause for the malfunction, and continuously retries until the log files have been successfully transferred to the server.

In one embodiment the data relay script has a child thread that periodically checks for an image capture command from the user. If the user issues an image capture command from the user interface 12, the system 10 sets appropriate flags alerting the data collection script to save the current frame of the camera view. Once the data collection script confirms a successful frame capture, the system 10 relays the image frame to the server 20 where it is saved. Upon the successful completion of the transfer, the system 10 updates the local flags, alerts the server 20 of the completion of the operation, and deletes the local copy of the image frame. The user can interact with the user interface 12 to access the image. If there is a failure in image transfer, the system 10 logs the cause for malfunction and attempts to re-transmit the image until it is successful.

In one embodiment a memory management script runs parallel to the data collection and relay scripts that periodically checks the system 10 for memory overflows. Log files (data and error) keep growing if the system has no access to the internet to post the data to the server. If the user fails to intervene and fix the issue, the system 10 runs out of memory and soon stops functioning. To prevent this from happening, a memory management script periodically checks the available system memory. If the available memory dips below a certain number, which as a non-limiting example can be 0.5 Gb, the script deletes the most historic data log files until the total free space is over, as a non-limiting example 0.5 GB. This ensures that the system 10 has sufficient memory to keep functioning as desired.

Figure 4:
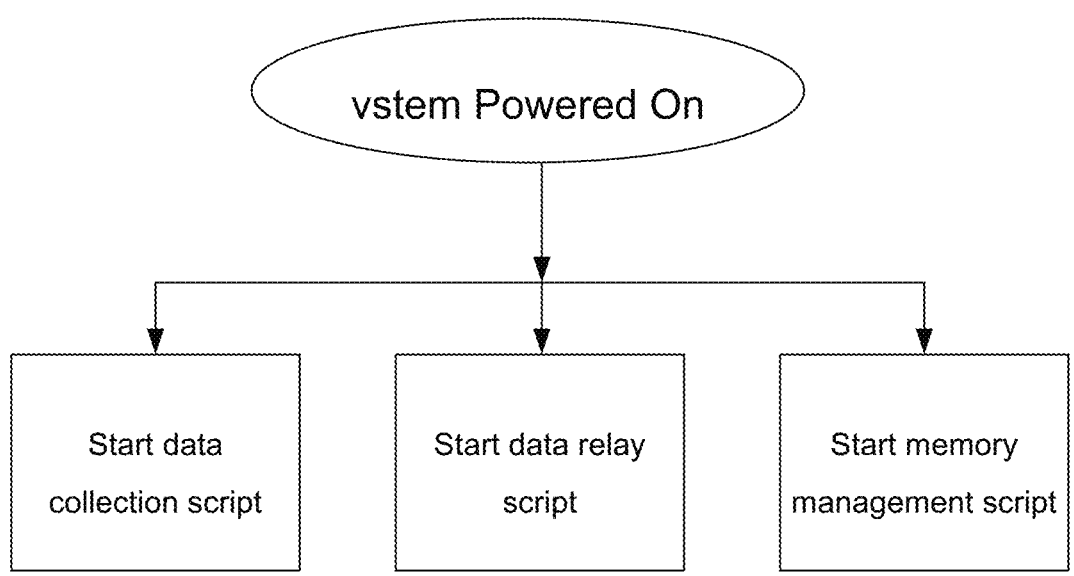
FIG. 4 is a flow chart that of the present invention where cronjobs run periodically every minute to confirm that all scripts are executing as desired and to restart any script that is not executing as desired.

Referring to FIG. 4, in one embodiment the system 10 is configured with cron, a time-based job scheduler. The cron has jobs, called cronjobs, to ensure that all the scripts are up and running. These cronjobs run periodically every minute and restart any script that is not executing as desired. The system is designed to execute the cronjobs upon boot.

The processor 13 executes various algorithms, including but not limited to, the modified version of YOLOv2 in C++ that provides a detection model for detecting people, proximity-based tracking (open source), memory management algorithm and the like.

Figure 5:
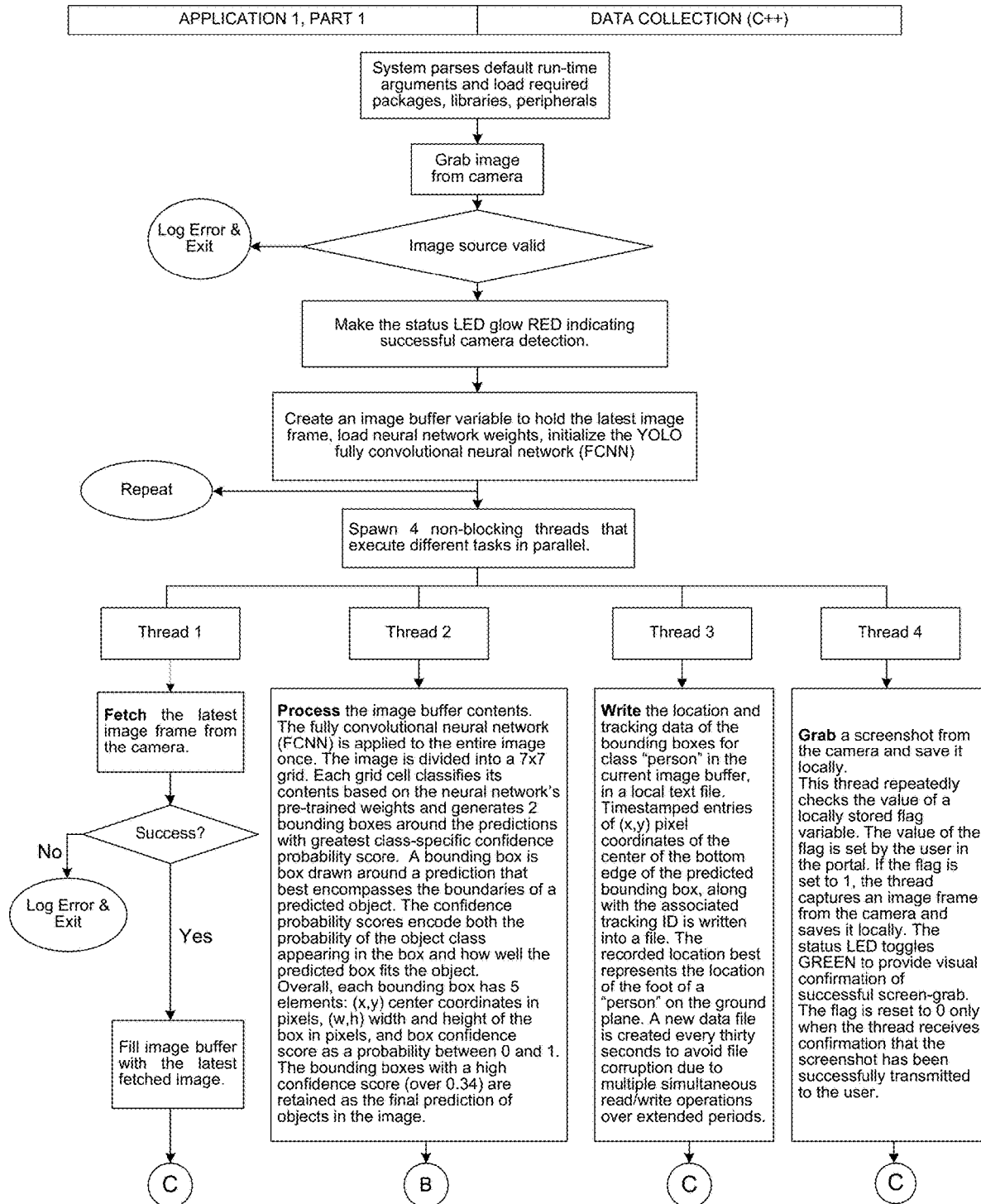
FIG. 5 illustrates one embodiment of the present invention where a field of view is monitored.

In this case, the system 10 grabs a single image frame from the camera 14 and saves it locally until it is transmitted to the user after which the local copy is deleted. This feature of the system 10 allows the user to be aware of the target field 16 that is being monitored and adjust the camera's 14 position if necessary, FIG. 5.

In one embodiment processor 13 is used to render 3D graphics. As a non-limiting example user interface 12 performs floating point operations (as opposed to integer calculations). This specialized design enables processor 13 to render graphics more efficiently than even the fastest CPUs.

In one embodiment processor 13 uses transistors to do calculations related to 3D computer graphics. In addition to the 3D hardware, user interface 38 can include basic 2D acceleration and framebuffer capabilities.

Because YOLOv2 is an object detection neural network, not a recognition method, and the tracking is purely based on the position of people across frames, the system 10 protects the identity of the people in the target field 16. Additionally, the system 10 performs all the computations in real-time and on-site. No image or video is stored locally or on the cloud unless the user specifically requests the system for a single frame view of the target field 16.

This request is made through a physical interaction with the system user interface 12. When this happens, the system 10 grabs a single image frame from the camera 14 and saves it locally until it is uploaded to the server 20. Once the system 10 confirms that the image is stored in the secure server 20, it automatically deletes the local copy. The image is made available to the user in the system user interface 12. This feature of the system 10 allows the user to be aware of the target field 16 that is being monitored and adjust the camera's 14 position if necessary or create overlays and boundaries on the latest field of view 16.

In one embodiment system 10 detects, locates and tracks people in the camera's field of view 16 in 2-D pixel coordinate format (X, Y) and sends this information, along with the tracking identifiers assigned to each detection, to the system server 20. The server 20 processes this data and calculates statistics including but not limited to: occupant density, common movement pathways and trajectories, areas and duration of dwell and motion, and the like. The user can interact with the system's user interface 12 remotely to generate reports and visualizations that can help them audit the asset under inspection.

In one embodiment system 10 builds on top of open source. As a non-limiting example system 10 uses a YOLOv2 model that is open source neural network written in C and CUDA.

In one embodiment a modification of YOLOv2 is used. The user interface 12 provided by the system is instrumental in delivering different visualizations, statistics, and linking pixel data to the physical space.

Via the user interface 12, a reference object in the field of view is selected, and the dimensions of each side is then determined. The dimensions of the object are initially input by the user. But the grid-square size is not limited to this dimension—it can be customized.

The reference object is selected by the user using the system's user interface 12. The user inputs the dimensions of each side of the reference object. Then a grid is overlaid upon the static image. This grid is composed of grid squares (just like a chessboard) with dimensions (length and width) that match the actual size of the reference object, though the on-screen dimensions of the grid squares will/may vary due to the perspective effect from the camera angle. The user can expand or reduce the number of grid squares, while keeping its dimensions constant, using the UI. The user may also sub-divide the grid into smaller grid squares and the system will automatically/dynamically compute the new dimensions of each grid-square. (application: to create precise physical zones in the camera view), which provides a tracking of people. Once the grid is finalized, the UI will then have enough information to relate pixel locations of people into their plausible locations in the real-world frame.

Another application of this grid is to compute the distance between two points selected by the user in the image frame using the dimension of a single grid square. The system computes the final size of each grid square based on the initial input from the user about the reference object. It can then use this calculation to derive the physical distance between two points set buy the user in the static image using the user interface 12.

The system 10 enhances security, does not do streaming, and the camera in focus details is not important.

System 10 only has a static image, and creates user interface 12. From this a reference object is selected, and a distance for each side is input by the user using user interface System 10 adds a layer of grid-squares to the reference image where each grid square has the same dimensions as the reference object selected by the user. The user may customize the number of gridlines segmenting the camera view, the tracking of people, and system 10 will dynamically compute the new dimensions of each grid-square.

The number of pixels in each grid square will vary, but the actual physical space represented by the grid-squares remains constant even though the grid-squares might appear to be skewed in the camera view due to its deployment. System performs calculations to determine a dynamic relationship between the on-screen pixel locations and actual locations in the physical space. These calculations can relate the motion of a person in 2D image to their movement in 3D physical space. As a person begins to move in the camera's view 16, system 10 knows where the person moves in the real-world space despite the image distortion caused by perspective.

In one embodiment a physical change is made to hardware components of system 10. In one embodiment, when an action is taken there is a physical change to one or more of: circuits; power sources, relays; change the way a device transmits images, radio power systems, and the like.

Database 19 periodically monitors system 10 for data relay. If database 19 fails to receive data from system 10 in over 24 hours or after a customized period of time as set by the user, database 19 notifies the user via email and/or text message. The user may verify if system 10 is active and online using the status LED attached to it and intervene accordingly.

User interface 12 allows the user to interact with system 10 remotely through a virtual button that captures the camera view. System 10 streams the static image to user interface 12 and provides the user with a visualization of the field that system 10 is analyzing.

As a non-limiting example, system 10 uses processor 13 to perform an accelerated parallel computation in real-time on a series of image frames acquired by the camera 14. The system 10 is capable of anonymously detecting and tracking people within a target field that is captured by the camera 14. In one embodiment the system 10 relies on an open source fully convoluted neural network, which as a non-limiting example is YOLOv2, for detecting objects of class, including but not limited to, "people" within an image and uses a proximity-based tracking algorithm to track people across image frames. As a non-limiting example, cartesian pixel coordinates of people are detected in a field of view 16 along with unique numeric identifiers that are assigned to track each individual within the field of view 16, and relays the information to the server 20, which can be cloud based. As a non-limiting example, the data is translated from a 2-dimensional camera plane into 3-dimensional physical locations.

As a non-limiting example this can be achieved by first grabbing an image from the camera 14, and then running a classification algorithm on the image.

Figure 6:
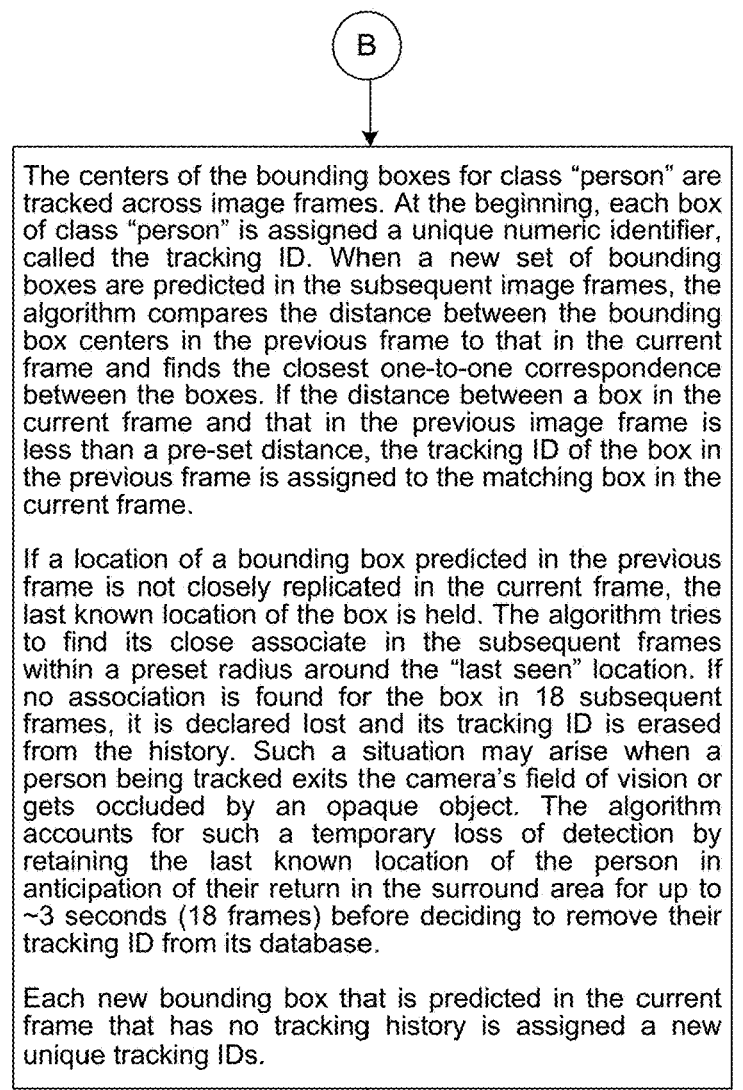
FIG. 6 is a flow chart that illustrates one embodiment of an application of the computer vision system of the present invention, where the system software code runs multiple concurrent threads, each performing a single task.
Figure 6:
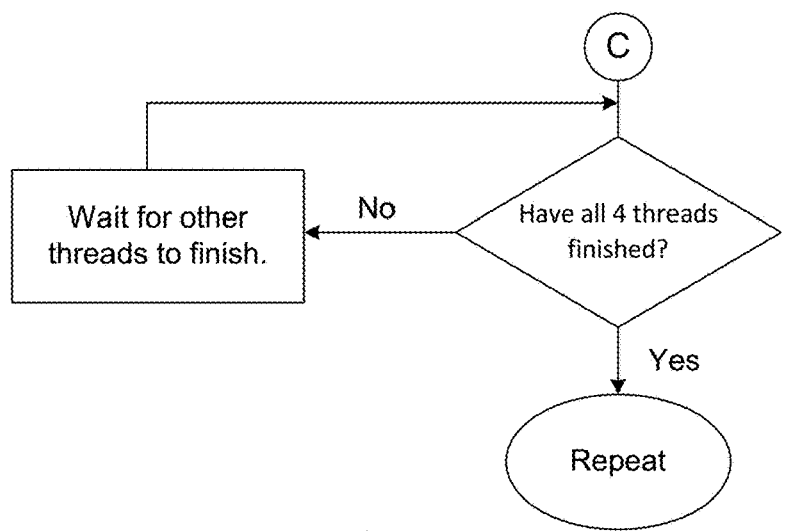

In one embodiment, tracking is added to the YOLO code. As a non-limiting example this can be achieved by sending it to an existing algorithm Yv, people are then detected in the image and tracking of the person is then added in the space. As a non-limiting example, it combines different open source codes in order to do the tracking; each person is detected in a bounding box. this is done by YOLO code; the x and y center of the box, the height and width of the box is provided by YOLO, Referring to FIG. 6, in one embodiment the system software code runs multiple concurrent threads, each performing a single task. The algorithm responsible for detecting and tracking people executes independently of the algorithm that relays the data to the server 20. This ensures that a break in one section doesn't affect the rest of the system 10, and makes the system 10 resistant to complete failure. The system 10 periodically checks to determine if all the software code is executing as desired at a minute resolution using cronjobs. The system 10 ensures that any errors encountered by it are recorded with timestamps so that system administrator is aware of the source of malfunction and may promptly intervene as required.

In addition, there is a LED 22, that can be a multi-color LED 22, attached to the system 10 whose color reflects the system's state, alerting the user of any malfunction. System 10 also monitors the amount of available memory and deletes data files that are no longer of use In one embodiment LED 22 is an RGB LED that is interfaced with a Nvidia board to indicate the status of the system 10 for the user.

As a non-limiting example, the LED's glow as follows:
a. RED only: The system 10 has successfully detected the camera and is performing detection and tracking of people within the camera's field of view 16. However, the system 10 lacks access to the internet or has been unsuccessful in uploading the log files (data and error) to the server.
b. BLUE only: The system 10 has successfully established access to the internet and any attempt to upload log file (data and error) to the server is successful. However, it has failed to detect a camera.
c. MAGENTA/PINK: The system 10 has successfully detected the camera and is performing detection and tracking of people within its view. It has also established connection to the internet and is successfully uploading log files (data and error) to the server.
d. Toggle GREEN—Single frame screenshot of camera field of view is being saved as an image screenshot.
e. OFF: The system 10 is experiencing total malfunction. If the system 10 is powered on when this happens this indicates that the system is unable to detect the input camera source or connect to the internet.

As a non-limiting example system 10 can be used for a variety of different applications, including but not limited to: detection of people and identification of their location in the field of view 16 as well as their actual physical location in the space; identification and quantification of group formation, physical closeness of group members, each group member's duration of stay in group; identification of common movement pathways within a space; identification of common areas of dwell in a space; identification of locations in which "collisions" regularly occur (two or more people coming within a defined field of proximity, and for each collision, a record of where each party came from, and their paths of movement post "collision"; identification and quantification of space use at a sub room level of granularity; identification and quantification of equipment or furniture use; identification of the dimensions of a space from only a picture and a user input reference marker. The techniques and capabilities of the system can be applied to: space design and planning; accountability/objective measurement of impact of architecture and design work; chargebacks for space, equipment and furniture use; enforcing service level agreements for cleaners, service work, etc.; physical security; coaching and performance improvement (movement and pathway efficiency); quantifying service and amenity use; quantifying reaction to advertising (dwell time, pathway adjustment etc.); animal wellness and habitat/intervention design; emergency health and safety—evacuation routes, evacuation assuredness, responder wayfinding; utilization and occupancy heatmaps, pathway tracking, and asset management, for spatial auditing and the like.

As a non-limiting example, the applications mentioned above can be done in a variety of different ways, including but not limited to: fully on premises behind a client firewall with user interface 12 locally hosted on client server; on premises processing with throttled/limited bandwidth relay (to prevent possible streaming) to server for analysis, user interface 12 hosted on cloud server; on premises camera streaming video to cloud server for processing and analysis, user interface 12 hosted on cloud server.

In one embodiment system 10 is used with at least one establishment selected from: retail; the food industry; and the beverage industry.

In one embodiment system 10 is used relative to advertising costs of an establishment.

In one embodiment system 10 provides real time information relative to an establishment's current occupancy.

In one embodiment system 10 provides near real time information relative to an establishment's current occupancy and provides information selected from at least one of: the ratio of an establishment's patrons to employees; the number of establishment patrons compared to establishment inventory; and the number of people who are entering and/or exiting an establishment.

In one embodiment system 10 identifies a condition of interest with regard to occupant count, occupant activity, occupant location, occupant ratios, and/or some derivative or combination thereof and generates information summarizing the identified condition.

In one embodiment system 10 sends out an alert to an establishment describing the identified condition of interest e.g. that the establishment capacity has dropped below a target capacity.

In one embodiment system 10 provides an interface through which establishment personnel can select from a list of a prepopulated advertising messages that are tied to the identified condition of interest, select a target recipient population based on demographics, location/proximity, historical behaviors, etc. and send the selected advertising campaign to the selected target recipients. System 10 records the conditions, timing, responder, selected response, target recipients, and resulting impact on occupancy in the selected response time window.

In one embodiment system 10 is configured to allow an establishment to release a geofenced advertising message.

In one embodiment system 10 prevents additional or scheduled marketing/advertising communications based on current occupancy levels.

In one embodiment system 10 provides a determination of an establishment's indoor and outdoor conditions.

In one embodiment system 10 is configured to provide a tie in to a point of sale data.

In one embodiment system 10 provides an establishment with a capability to model the impacts of different environmental conditions on customer behavior including, but not limited to; selection of the establishment, purchase selection, purchase volume, duration of stay, next destination.

In one embodiment system 10 provides recommendations to the establishment regarding the environmental conditions that are most likely to result in specific patron, passerby and/or staff behaviors.

In one embodiment the system 10 automatically tunes the environmental conditions in real time to establish the environmental conditions that are most likely to result in the specified patron, passerby and/or staff behaviors including but not limited to dwell, spend, product selection, purchase volume and/or next destination.

In one embodiment the system 10 allows an establishment to make decisions based on knowledge of what is actually happening in an establishment space.

In one embodiment the system 10 is configured to improve feedback models to an establishment.

The one embodiment the system 10 is configured to provide management of establishment staff and perishables.

In one embodiment system 10 is configured to provide notification to patrons or potential patrons relative how busy the establishment is.

In one embodiment the system 10 is configured to reduce an establishment's marketing expenses.

In one embodiment the system 10 is configured to provide a more effective expenditure of an establishment's marketing expenses.

In one embodiment the system 10 includes environmental sensors configured to help draw patrons into an establishment space.

In one embodiment the system 10 is configured to provide a real time metric of how many patrons are at an establishment.

In one embodiment sensors provide information as to an establishment's current environmental conditions.

In one embodiment the system 10 is configured to provide for an adjustment of an establishment's environmental conditions.

In one embodiment the sensors provide information relative to an establishment current environmental and occupancy that are used for advertisement purposes.

As a non-limiting example with the use of a user interface 12 the system 10 doesn't care about the pitch of the camera 14. As long as camera 14 has a good view of the target field 16 system 10 does not care about how camera 14 is deployed. Camera 14 deployment doesn't depend on on-site network for communication with the system. The user picks the four vertices of any object in the camera's field of view 16. This reference object should have four corners, pairs of parallel edges in the physical world which appear to be skewed in the camera's perspective, and have known dimensions. As a non-limiting example, a reference object 24 is any selected area of physical space within the camera's field of view which is identified by the user as the standard unit of physical space division to be used for analysis.

In one embodiment data, in-coming from camera 12, is protected and privacy is maintained. In one embodiment the processing of a camera image is performed on-site, not in the cloud or a remote location. Instead the camera image is received at a box 26 deployed on the premises.

In one embodiment a single image frame from the camera is taken and relayed to the user interface via the server in order to make sure that camera 12 is still in line with a reference object (points) 28.

In one embodiment, a gyroscope or accelerator is at camera 12 to see if camera 12 has shifted from its original position from which it captured the initial shot that served as the camera view reference. This is because system 10 doesn't stream video.

System 10 does not stream video and maintains privacy but also knows that the reference points 28 are in the same location. As a non-limiting example, this can be achieved through hardware, including but not limited to: an accelerometer 30 or identification of some other reference object or marker on a target field 16 and comparison of the current detected location of the reference object/marker to the stored location coordinates at a set frequency, which as a non-limiting example can be constantly. As a non-limiting example, 6 DOF IMU (instead of an accelerometer 30), is used to understand how the camera has moved, including but not limited to pitch, yaw, roll, x, y, z and the like.

As a non-limiting example of constantly, the system periodically compares the features within a user selected reference region on the static image using user interface 12 across frames. This reference region is assumed to be free of occlusions at all times. Therefore, any difference in the pixels within the reference region constitutes a change in the camera's 14 view and position. Any change in its position constitutes a change in the camera's 14 position. As a non-limiting example, the user may be alerted immediately through email, text message and the like. This allows the user to intervene and take action to either update the user interface 12 with the new view of the camera 14, or revert its position to the old view. No video is stored anywhere at any point of time.

Figure 7:
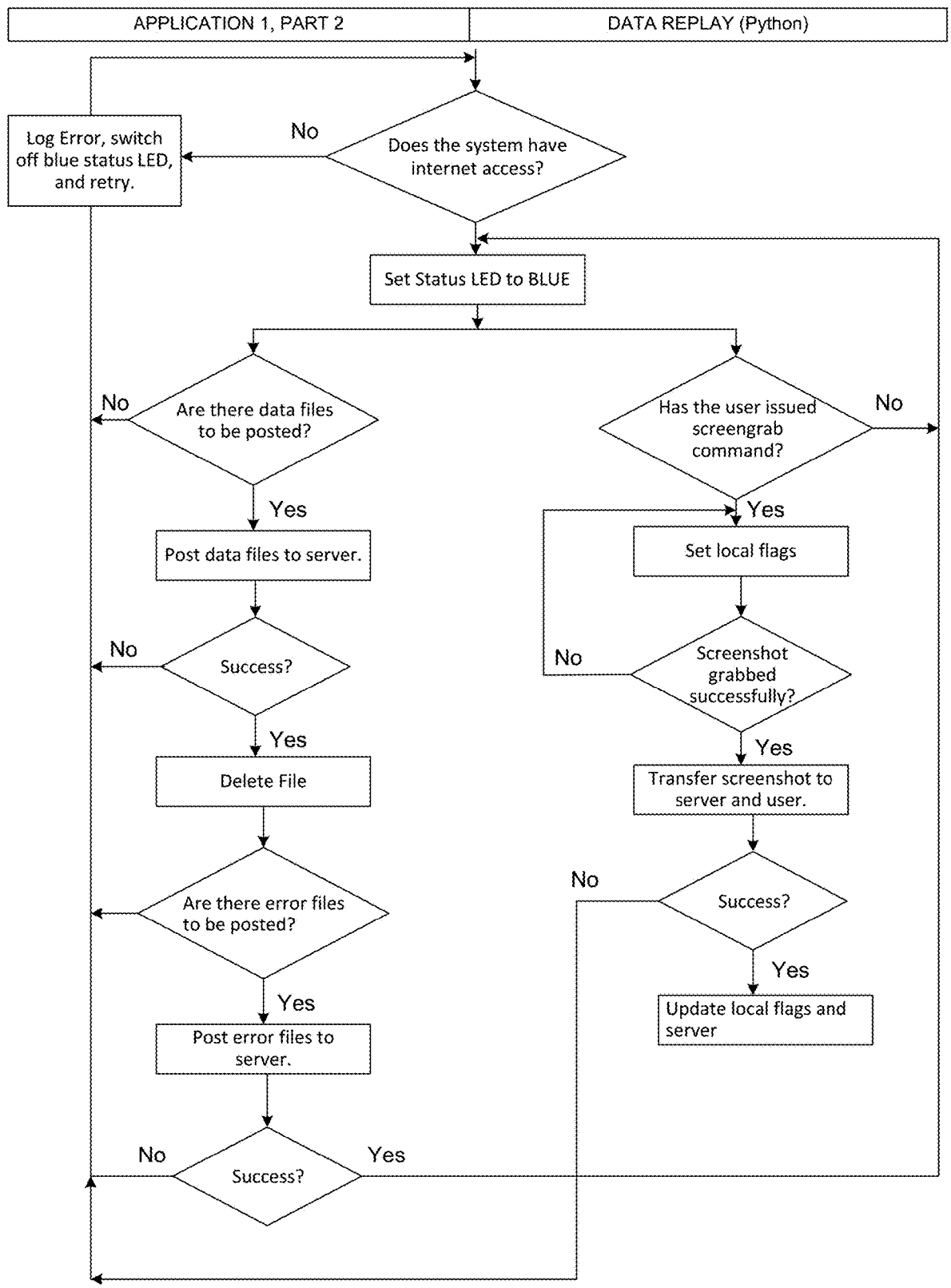
FIG. 7 illustrates one embodiment of the present invention where different zones can overlay as different layers.

In one embodiment an on-line interface 12 is provided. Interface 12 includes one or more activation mechanisms, including but not limited to a button that is used to obtain a static image of what the camera 14 sees. Although system 10 does not stream video, it is not blind and provides the user with a snapshot of the camera's view through the capture and relay of static image streamed to the server 20 upon the user's command. The user can create custom zones 34 on the static image using the user interface 12. As a non-limiting example these different zones can overlay as different layers, as illustrated in FIG. 7.

As previously mentioned, in one embodiment system 10 provides for people detection, relay and infield coordinates in pixels. As a non-limiting example, the tracking of people within a space is completely anonymous. Tracking IDs are unique numeric identifiers that are generated at random and associated with each individual detected in the camera view. Each new person in a field, including re-entry into the field following an exit, is assigned a new tracking ID.

The pixel coordinates can be translated to location in physical space. As a non-limiting example, using a two-point perspective representation of the reference object selected by the user, system 10 overlays a grid of definite size over the reference image where, each grid unit has the same physical dimensions as the reference object. This grid aligns the 2-D pixel coordinate space with the actual 3-D physical space. The location of each pixel in the image plane can be translated into physical locations.

The grid units can be further subdivided into more granular units to provide a more precise location in the physical world. The system is robust and flexible to user customizations and abstracts the mathematical computations from the user, it provides the user with the final count of the number of grid units defining the space, and the dimensions of each grid unit. There is a lot of scope to improve the features of the system, some of which include, but not limited to:

In one embodiment there is no need for a physical connection between the source of image input and the system 10. As a non-limiting example this can be achieved by establishing a private local network between the camera 14 and the system 10 to stream the video to the system 10 for processing. In one embodiment an internet enabled camera 14 is used the feed from the camera 14 is fed to a remotely located system 10, or a video file is uploaded using the system user interface 12 for processing.

In another embodiment an inertial measurement unit (IMU) 36 is coupled to the input camera 14 to constantly monitor its orientation and promptly alert the user or the system administrator if there is any change in its position. As a non-limiting example, a 6 DOF IMU can be used to measure the orientation of the camera 14 along the x, y, z plane, and its pitch, yaw and roll angles. This information is useful during camera installation, or in understanding the exact amount by which the camera 14 has moved.

In one embodiment a "view stitching" feature is added to the system 10 that enables an individual system to process the video from multiple camera sources and present it to the user as a single seamlessly stitched panoramic view of the total target field.

In one embodiment a memory management script is modified to delete alternate historic files instead of statically deleting the oldest file in the system to maintain coherence of historic data.

In one embodiment a proximity-based tracking method is shifted to a predictive tracking technique that considers the person's historic movement pattern. This improves the tracking efficiency especially in crowded spaces with high density of collisions, crossovers, and grouping.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A computer vision system, comprising:
    a camera that captures a plurality of image frames in a target field;
    a user interface coupled to the camera, the user interface configured to perform accelerated parallel computations in real-time on the plurality of image frames acquired by the camera; and
    wherein the system identifies dimensions of a space from only a picture and a user input reference marker and provides physical security coaching.

2. The system of claim 1, wherein video feed captured by the camera and relayed to a processing unit for processing and automated analysis is not stored in the system.

3. The system of claim 1, wherein images are processed in real time and data regarding the space and its occupants is extracted, and the next frames of the video overwrite those frames that were just processed.

4. The system of claim 1, wherein only the data extracted from each frame is stored locally and/or relayed to a system servers.

5. The system of claim 1, wherein the system provides performance improvement.

6. The system of claim 1, wherein the system provides movement and pathway efficiency.

7. The system of claim 1, wherein the system creates a model of the conditions of an establishment that is informed by historical data, and runs scenarios of known intervention options through the model to assess intervention options based on their cost, impact, and any other factors of interest to the establishment owner, when current conditions are observed by the system to be of interest or concern, the system generates an intervention recommendation for the establishment that is based on modeled outcomes, when a modeled intervention is employed, the system observes the impact of the intervention on the conditions, and if the observed impact is different than the modeled impact, the system updates the model based on the observed data.

8. The system of claim 7, wherein an observed impact of the intervention is compared with a modeled impact of the action, and then updates the model.

9. The system of claim 8, wherein the systems provide for a continual improvement to the model.

10. The system of claim 1, wherein the system is configured to provide a recommendation that is model directed to at least one of: an interest; and concern of an establishment.

11. The system of claim 1, wherein the system is configured to make one or more recommendations to a human.

12. The system of claim 11, wherein the system is configured to provide a mechanism by which the human can take the one or more recommendations or other action.

13. The system of claim 12, wherein the other action that is modeled to best address a condition of interest to an establishment.

14. The system of claim 1, wherein the system measures at least one: conditions post an intervention; and action, and compares an observed result to a modeled result.

15. The system of claim 1, wherein the system updates a model selected from at least one of: f machine learning and artificial intelligence.

16. The system of claim 1, wherein the system is used with at least one establishment selected from: retail; the food industry; and the beverage industry.

17. The system of claim 1, wherein the system is used relative to advertising costs of an establishment.

18. The system of claim 1, wherein the system provides near real time information relative to an establishment's current occupancy and provides information selected from at least one of: the ratio of an establishment's customers to employees; the number of establishment customers compared to establishment inventory; and the number of people who are entering and/or exiting an establishment.

19. The system of claim 1, wherein the system identifies a condition of interest with regard to occupant count, occupant activity, occupant location, occupant ratios, and/or some derivative or combination thereof and generates information summarizing the identified condition.

20. The system of claim 1, wherein the system sends out an alert to an establishment describing the identified condition of interest e.g. that the establishment capacity has dropped below a target capacity.

* * * * *